(12) United States Patent
Tsujimoto et al.

(10) Patent No.: US 6,261,004 B1
(45) Date of Patent: Jul. 17, 2001

(54) MAIN SHAFT GEAR MECHANISM FOR AUTOMOBILE SPEED CHANGERS, AND TAPERED ROLLER BEARING USED THEREFOR

(75) Inventors: Takashi Tsujimoto; Mamoru Mizutani, both of Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/459,575

(22) Filed: Dec. 13, 1999

(30) Foreign Application Priority Data

Dec. 24, 1998 (JP) .................................... 10-367436

(51) Int. Cl.[7] .............................. F16C 33/58; F16D 23/06
(52) U.S. Cl. .............................................. 384/571; 74/339
(58) Field of Search ................................. 384/450, 571, 384/564, 565; 74/339

(56) References Cited

U.S. PATENT DOCUMENTS

| | | | |
|---|---|---|---|
| 3,918,778 | * 11/1975 | Jacobson et al. | 384/447 |
| 4,185,725 | * 1/1980 | Maina | 74/339 X |
| 5,007,747 | * 4/1991 | Takeuchi et al. | 384/450 |
| 5,711,738 | * 1/1998 | Abe et al. | 384/571 X |
| 5,852,947 | * 12/1998 | Tsujimoto | 74/339 |

* cited by examiner

Primary Examiner—Thomas R. Hannon
(74) Attorney, Agent, or Firm—Arent, Fox, Kintner Plotkin & Kah, PLLC

(57) ABSTRACT

An object is to exert the intended fretting-preventive effect without being influenced by the size of variation in rotation (variation in speed) or the size of vibration.

An arrangement comprising a main shaft gear 1 having a raceway surface 1c on its inner peripheral surface, a bearing inner ring 2 having a raceway surface 2a on the outer periphery, tapered rollers 3 disposed between the raceway surface 1c of the main shaft gear 1 and the raceway surface 2a of the bearing inner ring 2 and held at predetermined circumferential intervals by a cage 4, an imbalance means which produces a circumferential weight imbalance in the assembly of the tapered rollers 3 and cage 4, wherein the roughness of the cone back face 2b of the bearing inner ring 2 is 0.01–0.04 $\mu$mRa, and the roughness of the large end faces 3b of the tapered rollers 3 is 0.01–0.05 $\mu$mRa, and the radius of the large end faces 3b are worked such that the maximum value thereof including the working precision is substantially equal to the reference radius. Further, full crowning is applied to the rolling contact surfaces 3a of the tapered rollers 3 and the surfaces of the tapered rollers 3 are formed with coating films of the $MoS_2$ type.

14 Claims, 8 Drawing Sheets

MAIN SHAFT GEAR MECHANISM FOR AUTOMOBILE SPEED CHANGERS, AND TAPERED ROLLER BEARING USED THEREFOR

BACKGROUND OF THE INVENTION

The present invention relates to a main shaft gear mechanism for automobile (passenger car, truck, bus or the like) speed changers, and a tapered roller bearing used therefor.

For example, an automobile speed changer has a role to change the speed change ratio to meet widely varying travel conditions, thereby changing the engine torque so as to make smooth comfortable travel possible. Generally, the speed changer has to satisfy such requirements as proper speed change ratio, sufficient strength, durability, reliability, high power transmission efficiency, silence, and small-size and lightweight.

An example of this speed changer is a synchromesh type speed changer shown in FIG. 12. In this speed changer, a main shaft 11 and an auxiliary shaft 12 which are disposed parallel with each other with a predetermined spacing therebetween are supported for rotation in a mission case (not shown), said main shaft 11 being operatively connected to an output shaft (associated with the driving wheels), the auxiliary shaft 12 being operatively connected to an input shaft (associated with the engine).

The auxiliary shaft 12 is integrally provided with an auxiliary shaft gear 13, while the main shaft 11 has a main shaft gear 16 (which serves also as a bearing outer ring) rotatably mounted thereon through a bearing inner ring 14 and needle rollers 15 and constantly meshing with the auxiliary shaft gear 13. One side of the main shaft gear 16 is formed with spline teeth 17 and a cone 18, and a hub 19 is disposed close to the end surface of the cone 18 and integrally engagingly connected to the main shaft 11. A synchromechanism 20 is interposed between the hub 19 and the cone 18, and the outer periphery of the hub 19 has a sleeve 21 axially movably spline-connected thereto.

In the state shown in this figure, receiving the rotation of the auxiliary shaft gear 13, the main shaft gear 16 is idling with respect to the main shaft 11. On the other hand, when the sleeve 21 is moved axially rightward from the state shown in the figure, it meshes with the spline teeth 17 of the main shaft gear 16 through the synchromechanism 20, whereby the connection between the main shaft gear 16 and the main shaft 11 is established. Thereby, the rotation of the auxiliary shaft gear 13 is reduced by the main shaft gear 16 with a predetermined speed ratio and transmitted to the main shaft 11. During this speed change, the main shaft gear 16 rotates in synchronism with the main shaft 11 and the bearing inner ring 14.

In this connection, during speed change, the synchronous rotation of the main shaft gear 16 and the bearing inner ring 14 causes the needle rollers 15 to assume a stopped position on the raceway surfaces of the two members 14 and 16. On the other hand, repetitive action of external vibrations or the like could cause repetitive slight slippage between the needle rollers 15 and the raceway surfaces, so that the phenomenon called fretting in which the contact surface wears due to the relative repetitive slight slippage may become a problem.

In an arrangement intended to prevent fretting, the Parker process (phosphating) is applied to the raceway surfaces of the main shaft gear 16 and the bearing inner ring 14, and the rolling contact surfaces of the needle rollers 15 to reduce the wear resistance between the needle rollers 15 and the raceway surfaces. However, wear of Parker process coatings may make it impossible to expect a long-term satisfactory fretting-preventive effect.

I have previously proposed, as means capable of long-term prevention of fretting on the raceway surfaces of the main shaft gear and the bearing inner ring and on the rolling contact surface of rolling element, an imbalance means in the form of the irregular circumferential disposition of rolling element, the circumferential weight imbalance of a cage holding rolling element, or rolling element weight inequality (Japanese Kokai Patent Publication Heisei 9-292008). Depending on the size of variation in rotation (variation in speed) or vibration, however, it might be difficult to attain a satisfactory fretting-preventive effect.

SUMMARY OF THE INVENTION

An object of the invention is to be capable of exerting the intended fretting-preventive effect without being influenced by the size of rotative variation (variation in speed) or vibration.

A main shaft gear mechanism for automobile speed changers according to the present invention comprises an auxiliary shaft operatively connected to an input shaft associated with an automobile engine, auxiliary shaft gear mounted on an auxiliary shaft, a main shaft operatively connected to an output shaft associated with the driving wheels, a main shaft gear which has a toothed portion integrally formed on its outer peripheral surface and constantly meshing with the auxiliary shaft gear and which has a raceway surface on its inner peripheral surface, a tapered roller bearing interposed between the main shaft and the main shaft gear, an imbalance means which produces a circumferential weight imbalance in the assembly of the tapered rollers and cage of the tapered roller bearing, a clutch gear connected to the main shaft gear, and a synchromechanism which effects or interrupts transmission of engine torque between the main shaft gear and the main shaft through the clutch gear by the action of a selector, wherein at least one of the roughness of the cone back face of the bearing inner ring and the roughness of the large end faces of the tapered rollers of the tapered roller bearing is not more than 0.05 $\mu$mRa.

Further, a tapered roller bearing according to the present invention comprises a bearing outer ring having a raceway surface on its inner peripheral surface, a bearing inner ring having a raceway surface on its outer peripheral surface, tapered rollers interposed between the raceway surfaces of the bearing outer and inner rings and held at predetermined circumferential intervals by a cage, and an imbalance means for producing a circumferential weight imbalance in the assembly of tapered rollers and cage, wherein at least one of the roughness of the cone back face of the bearing inner ring and the roughness of the large end faces of the tapered rollers is not more than 0.05 $\mu$mRa.

In addition, in the main shaft gear mechanism for automobile speed changers and in the tapered roller bearing according to the present invention, it is preferable that the radius of the large end faces be worked such that the maximum value thereof including the working precision is substantially equal to the reference radius, and that the roughness of the cone back face of the bearing inner ring be 0.01–0.04 $\mu$mRa and that the roughness of the large end faces of the tapered rollers be 0.01–0.05 $\mu$mRa.

According to the present invention, in an arrangement having an imbalance means in the form of the irregular circumferential disposition of tapered rollers, the circumferential weight imbalance of a cage holding tapered rollers, or the rolling body weight inequality imbalance, the setting of the roughness of the cone back face of the bearing inner ring and the roughness of the large end faces of the tapered rollers in the aforesaid predetermined allowable range makes it possible to reduce sliding friction resistance between the raceway surface of the main shaft gear or bearing outer ring, or the raceway surface of the bearing inner ring and the rolling contact surfaces of the tapered rollers. Further, setting the radius of the large end faces such that the maximum value thereof including the working precision is substantially equal to the reference radius, makes it possible to reduce sliding friction resistance by increasing the radius of the large end faces of tapered rollers and reducing the contract surface pressure. In addition, if the surfaces of the tapered rollers are formed with coating films of the $MoS_2$ type it is easier to reduce sliding friction resistance.

Application of full crowning to the rolling contact surfaces of the tapered rollers results in axial and radial loads simultaneously acting during synchronous rotation of the main shaft gear or bearing outer ring and the bearing inner ring, and the roller skewing can be enhanced which is caused by misalignment owing to the fact that the tapered rollers are disposed in a space between the raceway surfaces of the main shaft gear or bearing outer ring and the bearing inner ring. In addition, it is preferable that the radius of curvature of the full crowning be not more than 10,000 mm.

Because of the reduction in sliding friction resistance and the skewing enhanced by misalignment described above, a satisfactory fretting-preventive effect is exerted for a long time in that the tapered rollers perform relative rotative motion even when the main shaft gear or bearing outer ring and the bearing inner ring are synchronously rotating with the speed changer placed in the neutral or other positions.

Further, since the fretting is prevented for a long time, the durability life of the bearing is improved and it becomes possible to reduce the size of the bearing. Therefore, reduction in size of the main shaft and peripheral parts is made possible, further reducing the size and weight of the speed changer while retaining durability and reliability.

DESCRIPTION OF THE PREFERRED EMBODIMENTS

Figure 1:
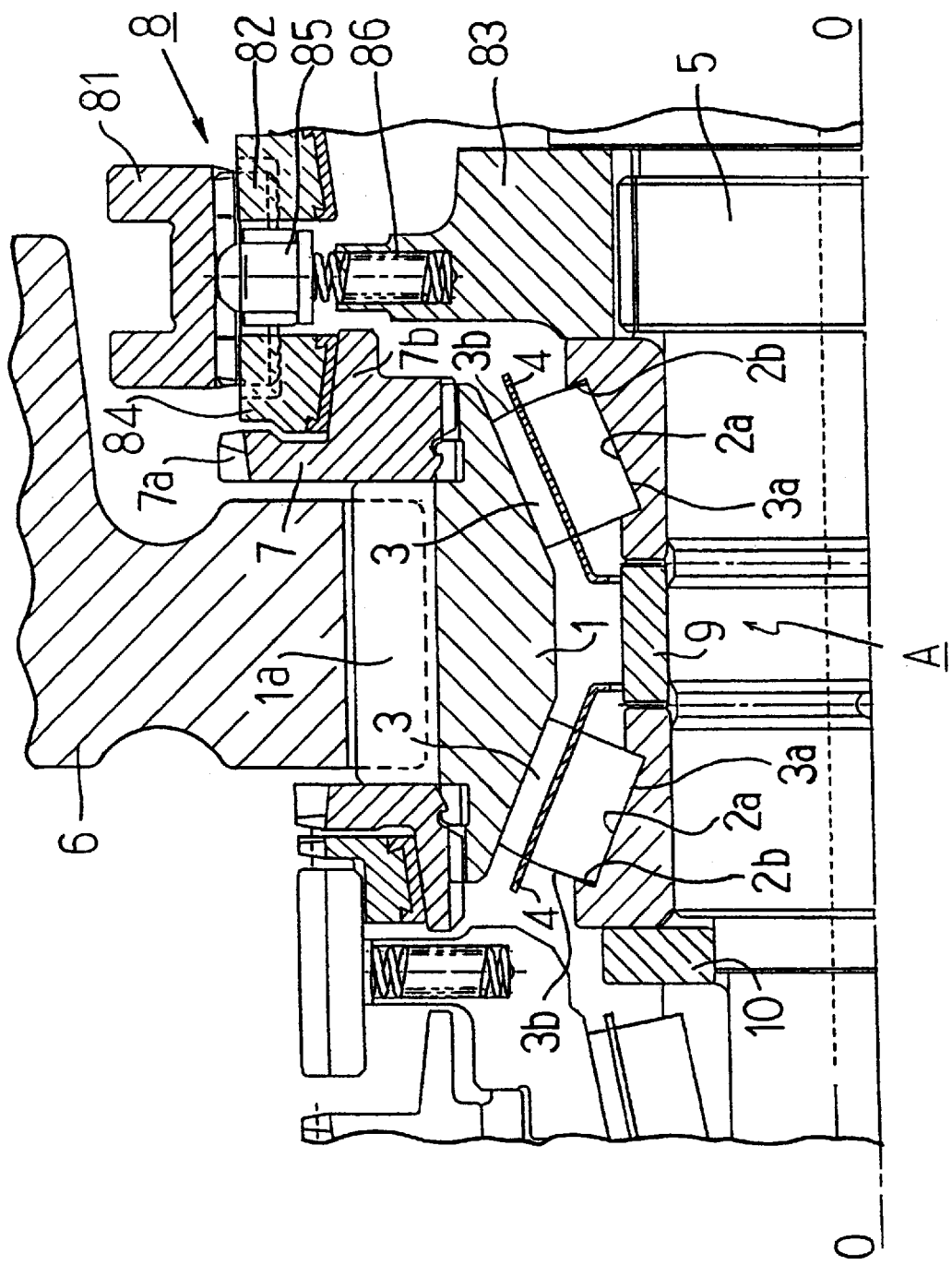
FIG. 1 is a sectional view showing a main shaft gear mechanism for automobile speed changers according to the invention.

FIG. 1 shows a main shaft gear mechanism for synchromesh type automobile speed changers and a tapered roller bearing A used therein. In this main shaft gear mechanism, a main shaft 5 and an auxiliary shaft (not shown) are disposed parallel and at a predetermined spacing, rotatably supported in a mission case (not shown). The main shaft 5 is operatively connected to an output shaft (not shown) associated with the driving wheels, while the auxiliary shaft is operatively connected to an input shaft (not shown) associated with the engine.

The auxiliary shaft is integrally (or separately) provided with an auxiliary shaft gear 6, while a main shaft gear 1 is rotatably mounted on the main shaft 5 through the tapered roller bearing A. A toothed portion 1a constantly meshing with the auxiliary shaft gear 6 is integrally formed on the middle portion of the outer peripheral surface of the main shaft gear 1, and clutch gears 7 are engagingly connected to the opposite end portions. The clutch gears 7 integrally have spline teeth on the outer periphery and a cone 7b on one side, and synchromechanism 8 is disposed close to the clutch gear 7.

The synchromechanism 8 comprises a sleeve 81 axially (horizontally as seen in the figure) movable by the action of a selector (not shown), synchronizer key 82 axially movably fitted in the inner periphery of the sleeve 81, a hub 83 engagingly connected to the outer periphery of the main shaft 5, a synchronizer ring 84 slidably mounted on the outer periphery of the cone 7b of the clutch gear 7, a presser pin 85 and a spring 86 elastically urging the synchronizer key 82 against the inner periphery of the sleeve 81.

In the state shown in the figure, the sleeve 81 and the synchronizer key 82 are held in the neutral position by the presser pin 85. At this time, the main shaft gear 1 is idling with respect to the main shaft 5 under the influence of the rotation of the auxiliary shaft gear 6. On the other hand, when the sleeve 81 is moved axially for example to the left from the state shown in the figure by the action of a selector, the synchronizer key 82, influenced by the sleeve 81, is moved axially to the left, pressing the synchronizer ring 84 against the inclined surface of the cone 7b of the clutch gear 7. Thereby, the rotative speed of the clutch gear 7 is lowered, and reversely, the rotative speed of the synchromechanism 8 is increased.

At about the time when their rotative speeds get into synchronism, the sleeve 81 is moved further axially to the left, meshing with the spline teeth 7a of the clutch gear 7, so that the main shaft gear 1 and the main shaft 5 are interconnected through the synchromechanism 8. Thereby, the rotation of the auxiliary shaft gear 6 is reduced at a predetermined speed change ratio by the main shaft gear 1 and transmitted to the main shaft 5. At this time, main shaft gear 1 rotates in synchronism with the main shaft 5 and the bearing inner ring 2 of the tapered roller bearing A.

Figure 2A:
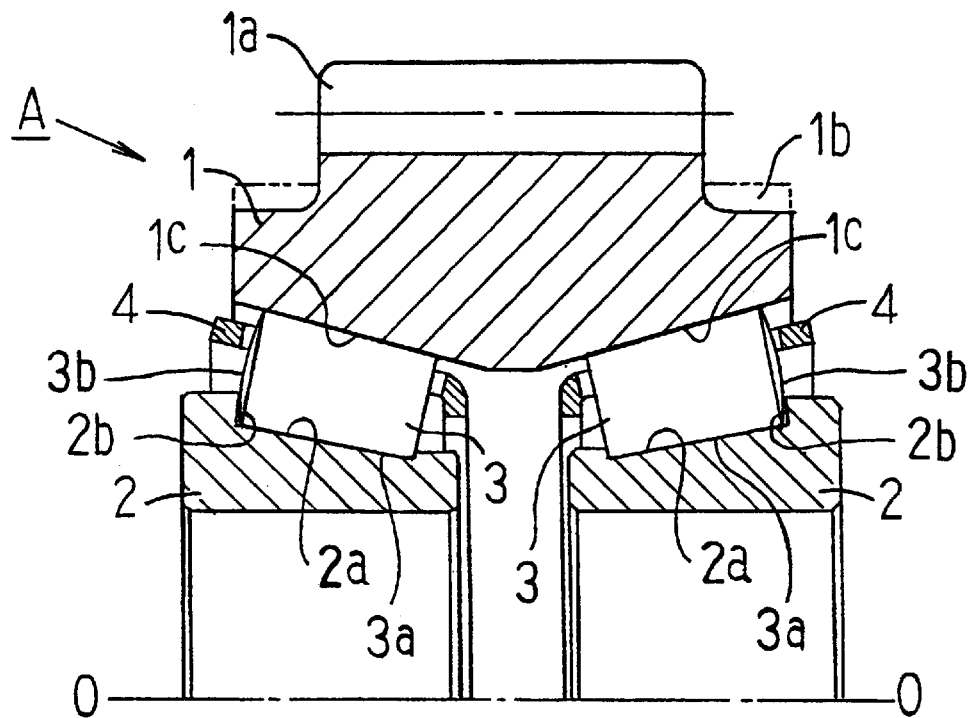
FIG. 2(a) is a sectional view showing a tapered roller bearing according to the invention, and (b) is a sectional view showing an assembly of a cage and tapered rollers.
Figure 2B:
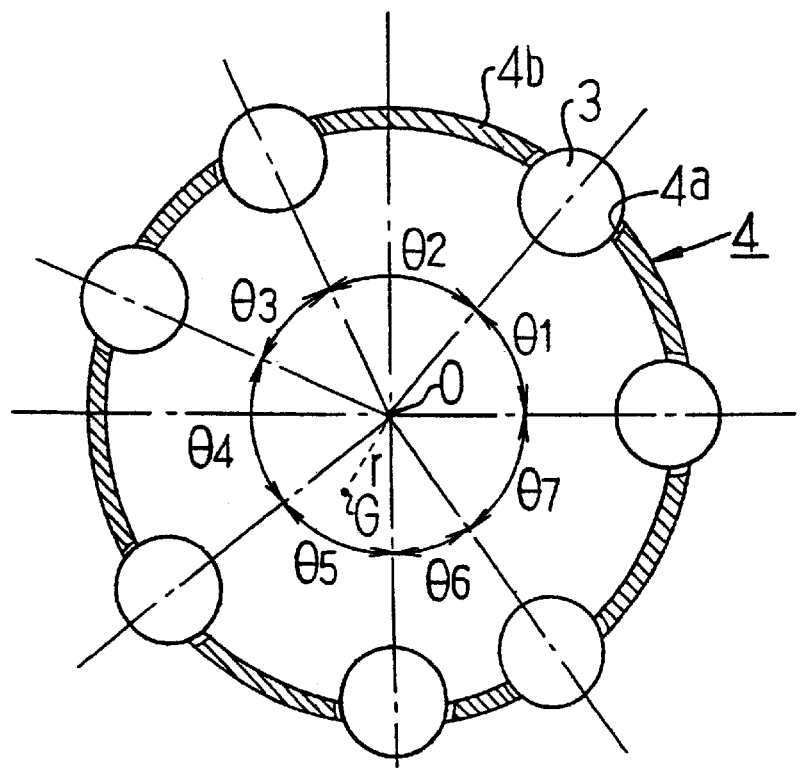

FIG. 2 shows a tapered roller bearing A used in a main shaft gear mechanism for synchromesh type automobile speed changers. This tapered roller bearing A comprises a main shaft gear 1 serving also as a bearing outer ring, a pair of bearing inner rings 2 having raceway surfaces 2a on the outer peripheral surface and fitted on the outer periphery of the main shaft 5, two rows of tapered rollers 3 disposed between the two rows of raceway surfaces 1c of the main shaft gear 1 and the raceway surfaces 2a of the pair of bearing inner rings 2, and a pair of cages 4 holding the respective rows of tapered rollers 3.

The main shaft gear 1 have integrally on its outer peripheral surface a toothed portion 1a constantly meshing with the auxiliary shaft gear 6 and toothed portions 1b to which the clutch gears 7 are engagingly connected and also have two rows of raceway surfaces 1c on the inner peripheral surface. In addition, the toothed portions 1b will be prepared when the clutch gears 7 are connected in the manner shown in FIG. 1. However, the connection of the main shaft gear 1 and the clutch gears 7 is not limited to the manner shown in FIG. 1.

During neutral position or speed change using another main shaft gear, the main shaft gear 1 is idling with respect to the bearing inner rings 2 (and main shaft 5) but during speed change using this main shaft gear 1 the main shaft gear 1 rotates in synchronism with the inner rings 2 (and the main shaft 5). In addition, as shown in FIG. 1, the pair of bearing inner rings 2 is fitted on the outer periphery of the main shaft 5 through a spacer 9 and their axial positioning is made between the end surface of the hub 83 and an end member 10.

As shown in FIG. 2 (*b*), the pockets 4a of the cage 4 are irregular pitch, so that the tapered rollers 3 received in the pockets 4a are circumferentially irregularly disposed. For this reason, the center of gravity G of the assembly consisting of the cages 4 and tapered rollers 3 is deviated by an amount of radius r from the shaft center O, so that a circumferential weight imbalance is produced in the assembly.

In FIG. 2 (*b*), the pitch angle $\theta n$ (n:1–7) of the tapered rollers 3 has at least two values. Let Wr be the weight of a tapered roller 3, Wcn (n: 1–7) be the weight of the rib 4b of the cage 4, and Rr and Rc be the position of the center of gravity from the shaft center O, then the imbalance quantity m is given by the imbalance quantity $m = (X^2 + Y^2)^{1/2} / r$, where $X = Wr \cdot Rr \cdot \Sigma(\cos \alpha n) + Rc \cdot \Sigma(Wcn \cdot \cos \beta n)$ $Y = Wr \cdot Rr \cdot \Sigma(\sin \alpha n) + Rc \cdot \Sigma(Wcn \cdot \sin \beta n)$ $\alpha n = \Sigma \theta n$, $\beta n = \Sigma \theta (n-1) + \theta n / 2$.

Figure 3A:
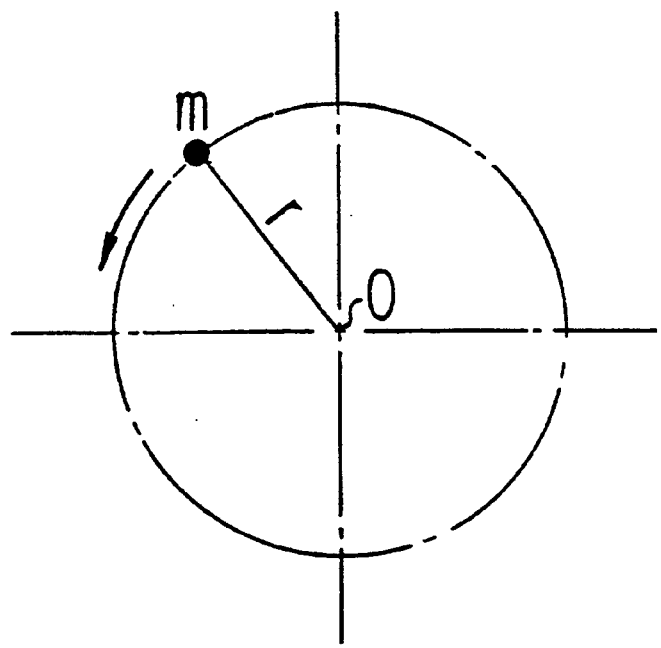
FIGS. 3(a) and 3)b) are sketchs; showing the position of a weight imbalance and the direction of relative rotation of the assembly.
Figure 3B:
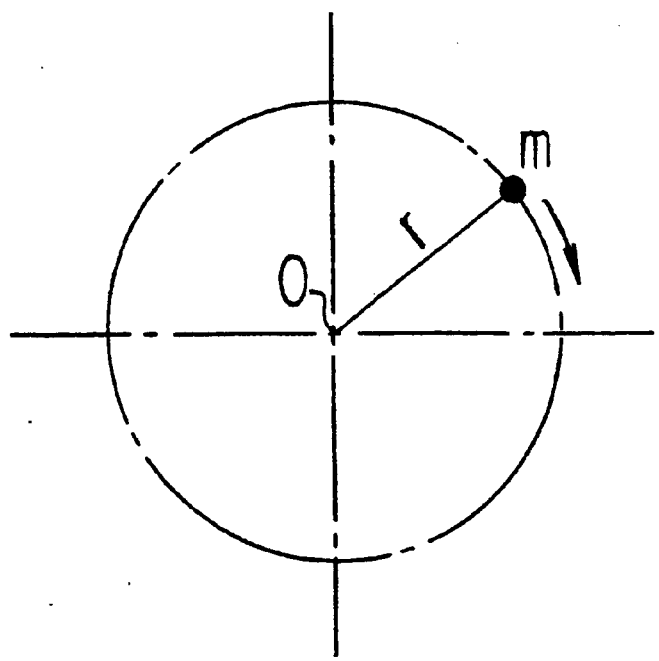

When the main shaft gear 1 receives the rotation of the auxiliary shaft gear 6 and rotates in synchronism with the bearing inner rings 2 (and the main shaft 5), the potential energy of the gravity with respect to the weight imbalance m is converted into kinetic energy, thereby producing a force (=m×r) relatively turning the assembly with respect to the main shaft gear 1 and the bearing inner rings 2 for example counter clockwise for the position shown in FIG. 3 (*a*) and clockwise for the position shown in FIG. 3 (*b*). For this reason, the position of contact between the tapered rollers 3 and the raceway surface 1c of the main shaft gear 1 and the raceway surfaces 2a of the bearing inner rings 2 varies, whereby fretting is prevented.

The imbalance quantity m may be suitably set according to working conditions; in this type of speed changer, it is preferably about 1–20 g for a radius of 50 mm from the shaft center O. That is, as a moment quantity (m×r), about 50–1,000 g ·mm is effective for prevention of fretting.

Figure 4A:
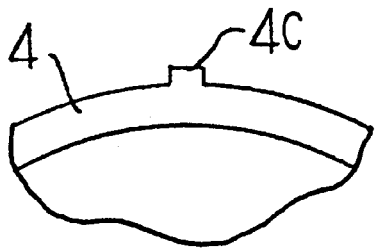
FIGS. 4(a) and 4(b) are front or back view showing a portion of the cage.
Figure 4B:
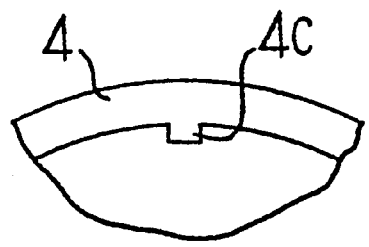
Figure 5A:
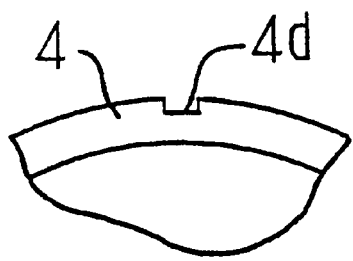
FIGS. 5(a) and 5(b) are front or back view showing a portion of the cage.
Figure 5B:
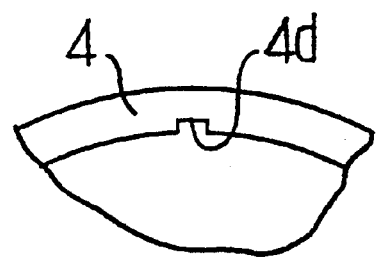
Figure 6:
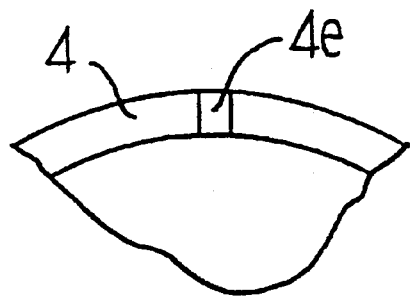
FIG. 6 is a front or back view showing a portion of the cage.

In the cage 4 with irregular pitch pockets 4a, it is preferable from the standpoint of assembling operation that an angular position which provides a reference be clearly seen (in this type of tapered roller bearing, the tapered rollers are held by crimping the cage, but since the crimping die is shaped to fit the pitch of the tapered rollers, it is necessary to effect phase matching between the cage and the crimping die). FIGS. 4–6 show designs having a distinction mark indicating the angular reference position of the cage 4.

FIG. 4 shows designs having a projection 4c formed on the reference position outer periphery on the larger or smaller diameter side of the cage 4 (in (*a*) of the figure), and a projection 4c formed on the reference position inner periphery (in (*b*) of the figure); FIG. 5 shows designs having a notch 4d formed on the reference position outer periphery on the smaller or larger diameter side of the cage 4 (in (*a*) of the figure), and a notch 4d formed on the reference position inner periphery (in (*b*) of the figure); and FIG. 6 shows a design having a notch 4e (or projection) formed on the reference position end surface on the larger or smaller side of the cage 4.

Figure 7A:
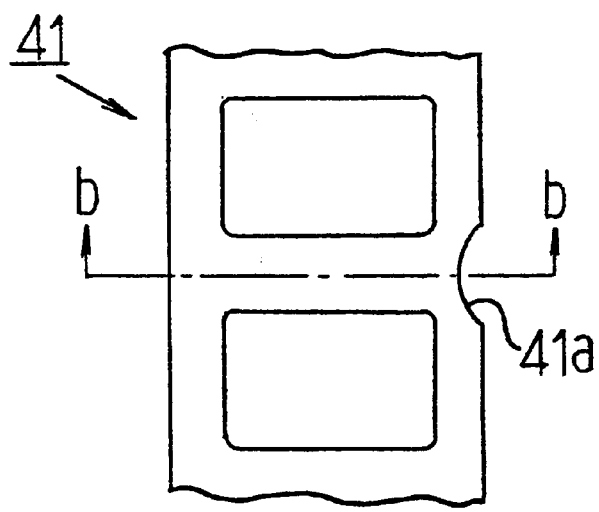
FIG. 7 (a) is a fragmentary plan view showing another example of a cage, and (b) is a sectional view taken along the line b—b in (a)
Figure 7B:
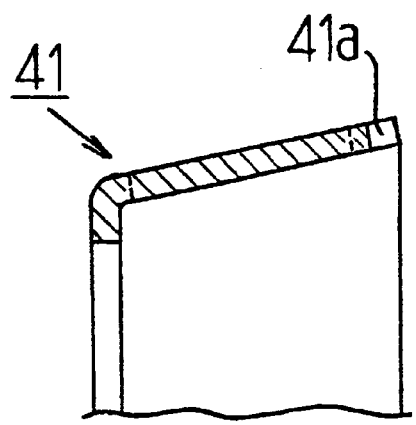
Figure 8A:
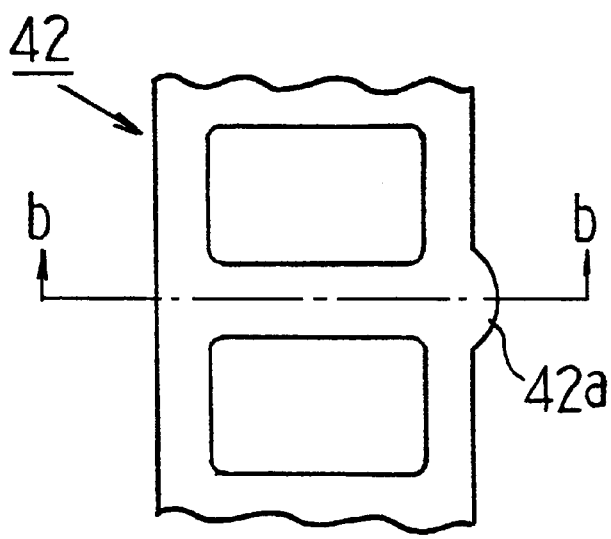
FIG. 8 (a) is a fragmentary plan view showing another example of a cage, and (b) is a sectional view taken along the line b—b in (a)
Figure 8B:
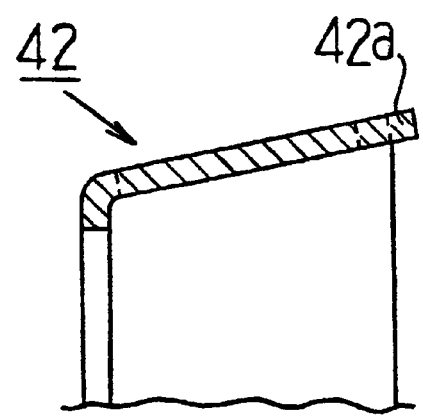

FIGS. 7 and 8 show designs having a circumferential weight imbalance formed in the cage. The weight imbalance in the cage results in the center of gravity of the assembly of the cage and tapered rollers being deviated from the shaft center, producing a circumferential weight imbalance in the assembly.

FIG. 7 shows a design having one or a plurality of notches 41a on the larger diameter side of the cage 41, and FIG. 8 shows a design having one or a plurality of projections 42a on the larger diameter side of the cage 42. The projection 4c and notches 4d and 4e shown in FIGS. 4–6 are provided as distinction marks and do not produce a substantial weight imbalance, whereas the notch 41a and projection 42a are provided to produce a weight imbalance. However, the notch 41a and projection 42a can be utilized also as distinction marks. In addition, the notch 41a and projection 42a may be provided only on the small diameter side or on both the smaller and larger diameter sides of the cage 41 (42).

Figure 9:
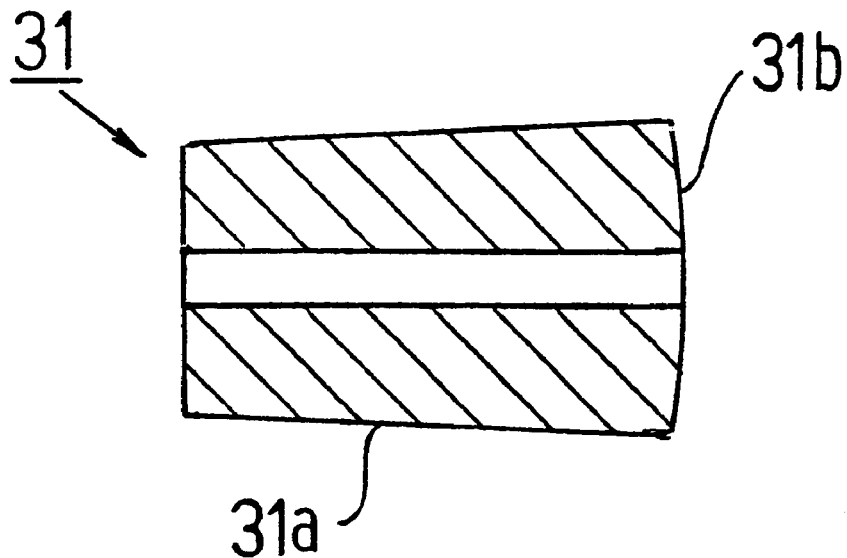
FIG. 9 is a sectional view showing another example of a tapered roller.
Figure 10:
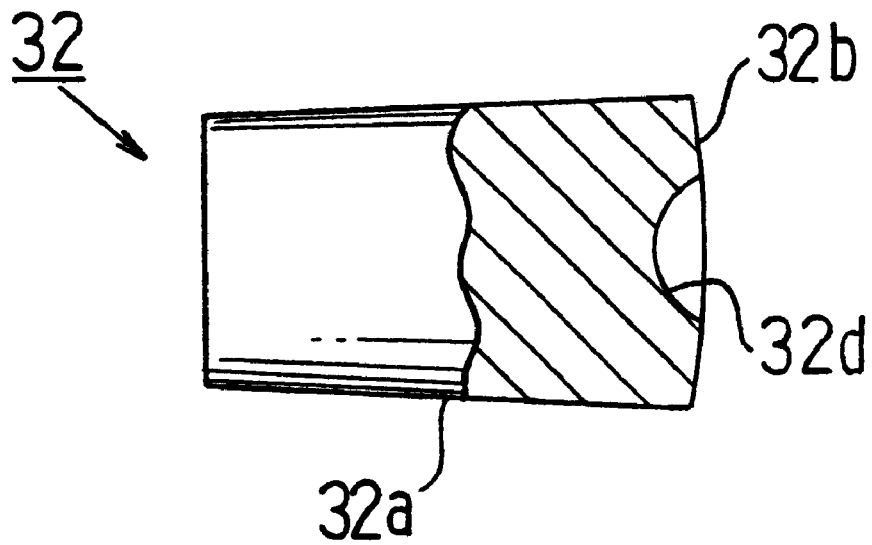
FIG. 10 is a sectional view, partly in section, showing another example of a tapered roller.

FIGS. 9 and 10 show designs wherein the weight of the tapered rollers in each row is made unequal. Since the weight of the tapered rollers is unequal, the center of gravity of the assembly consisting of the cage and tapered rollers is deviated from the shaft center, producing a circumferential imbalance in the assembly.

FIG. 9 shows by way of example a design wherein at least one tapered roller 31 is made hollow, and FIG. 10 shows by way of example a design wherein the large end face 32b of at least one tapered roller 32 is formed with a cut 32d (which may be formed on the small end face or on both the small and large end faces).

Figure 11:
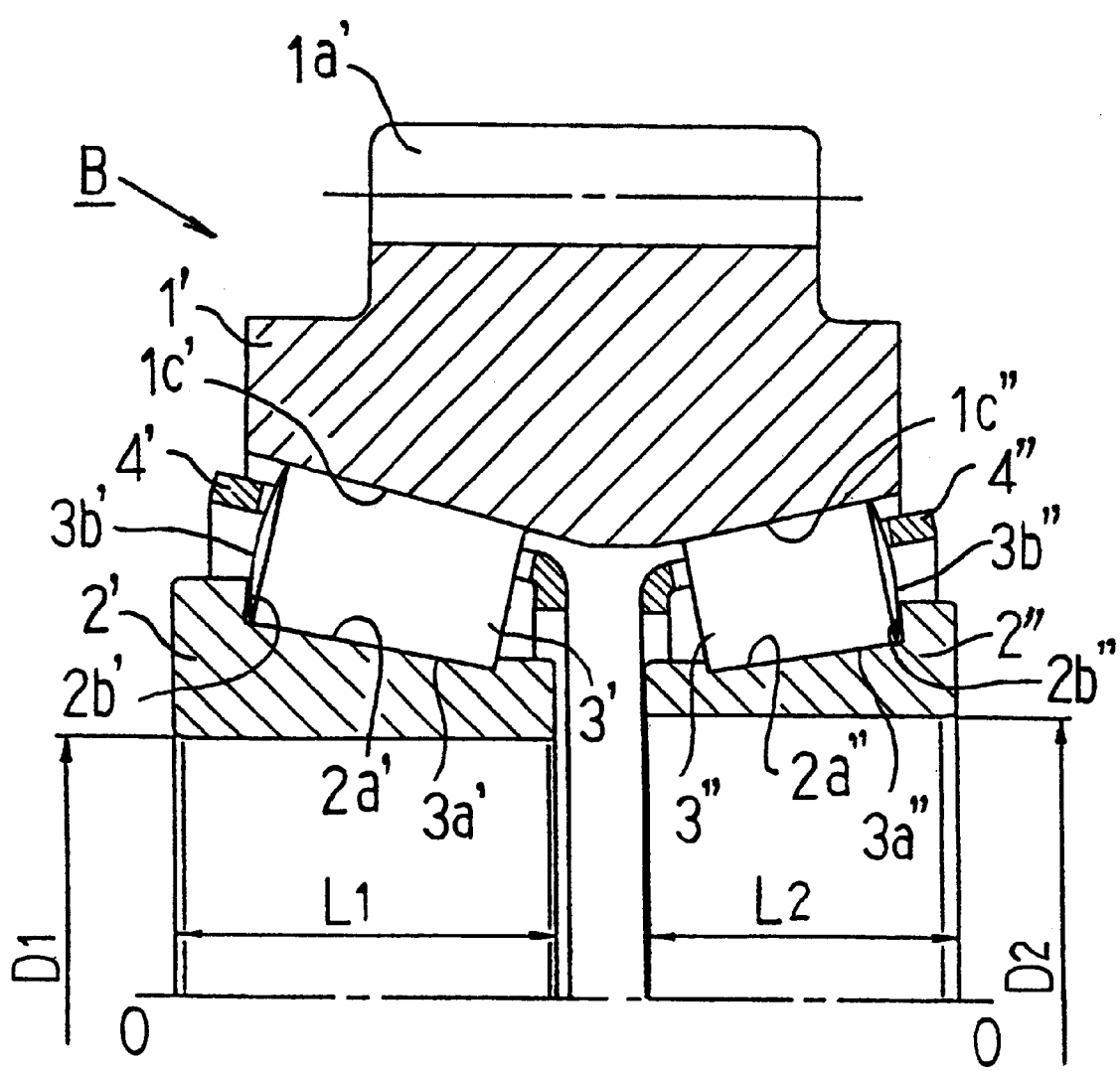
FIG. 11 is a sectional view showing another example of a tapered roller bearing.
Figure 12:
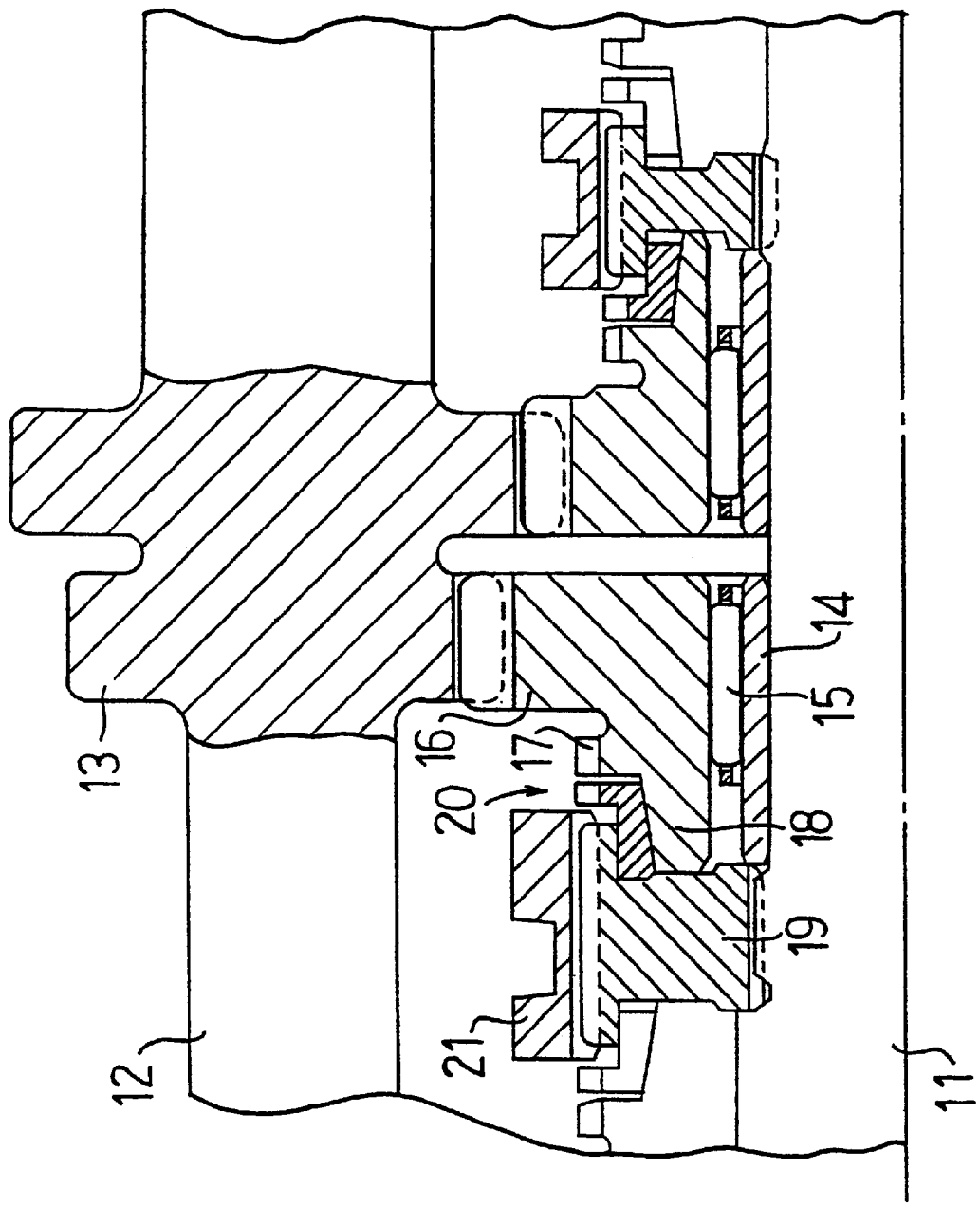
FIG. 12 is a main sectional view showing a conventional synchromesh type speed changer.

In a tapered roller bearing B shown in FIG. 11, the axial dimensions L1 and L2 and inner diameters D1 and D2 of the two bearing portions differ (L1 >L2, D1 <D2). In this design, problems on the layout in the mission case and different axial loads to be imposed (generally, axial load will be imposed on one side alone) are taken into consideration.

L1 is the axial width dimension of the inner ring 2' on the left (engine side) in the figure, and L2 is the axial dimension of the inner ring 2" on the right (driving wheel side) in the figure. The axial width dimensions of the raceway surfaces 2a' and 2a", the axial dimensions of the right and left tapered rollers 3' and 3", and the axial dimensions of the right and left raceway surfaces 1c' and 1c" of the main shaft gear 1' respectively differ from each other, corresponding to the ratio of L1 to L2. In addition, depending on the layout and how axial load is imposed, (L1 >L2, D1 >D2), (L1 <L2, D1 <D2), and (L1 <L2, D1 >D2) may be selected. The rest of the arrangement is the same as in the tapered roller bearing A described above.

In the present invention providing an arrangement having an imbalance means in the form of circumferential irregular disposition of tapered rollers, circumferential weight imbalance of a cage holding tapered rollers, or unequal weight of tapered rollers, the roughness of the cone back face 2b, 2b', 2b" of the bearing inner ring 2, 2', 2" (see FIGS. 1, 2 and 11) is set at about 0.01–0.04 μmRa (for example, 0.04 μmRa) through super-finishing (heretofore, it has been set about 0.1–0.3 μmRa through grinding).

Further, the roughness of the large end face 3b, 31b, 32b, 3b', 3b" of the tapered roller 3 (see FIGS. 1 and 2), 31, 32 (see FIGS. 9 and 10) 3', 3" (see FIG. 11) is set at about 0.01 –0.05 μmRa (for example, 0.04 μmRa) through super-finishing (heretofore, it has been set at about 0.06–0.2 μmRa through grinding).

Thus, by setting the roughness of the cone back face 2b, 2b', 2b" of the bearing inner ring 2, 2', 2" and the roughness of the large end face 3b, 31b, 32b, 3b', 3b" of the tapered roller 3, 31, 32, 3', 3" within the predetermined allowable range, it is possible to reduce the sliding friction resistance between the raceway surface 1c, 1c', 1c" of the main shaft gear 1, 1', 1" (serving also as the bearing outer ring) and also the raceway surface 2a, 2a', 2a" of the bearing inner ring 2, 2', 2", and the rolling contact surface 3a, 31a, 32a, 3a', 3a" of the tapered roller 3, 31, 32, 3', 3". Further, the radius of the large end face 3b, 31b, 32b, 3b', 3b" is worked such that the maximum value thereof including the working precision is substantially equal to the reference value (for example, maximum value of the radius/reference radius =99.8%). By working the radius of the large end face 3b, 31b, 32b, 3b', 3b" such that the maximum value thereof including the working precision is substantially equal to the reference value, it is possible to increase the radius of the large end face 3b, 31b, 32b, 3b', 3b" so as to reduce the contact surface pressure, thereby reducing the sliding friction resistance.

Further, if a coating film of the $MoS_2$ type is formed on the surface of the tapered roller 3, 31, 32, 3', 3", reduction of sliding friction resistance can be realized more easily. In addition, it was found suitable to use Solbest as the coating film of the $MoS_2$ type.

Further, application of full crowning to the rolling contact surface 3a, 31a, 32a, 3a', 3a" of the tapered roller 3, 31, 32, 3', 3" results in axial and radial loads simultaneously acting during synchronous rotation of the main shaft gear 1, 1', 1" and the bearing inner ring 2, 2', 2", and the roller skewing can be enhanced which is caused by misalignment owing to the fact that the tapered rollers 3, 31, 32, 3', 3" are disposed in a space between the raceway surfaces 1c, 1c', 1c" of the main shaft gear 1, 1', 1" and the raceway surface 2a, 2a', 2a" of the bearing inner ring 2, 2', 2". Relative motion of the tapered rollers 3, 31, 32, 3', 3" can be obtained. In addition, the radius of curvature of the crowning is not more than 10,000 mm (for example, 6,800 mm).

A control article (cage of irregular pitch alone) and a present inventive article (cage of irregular pitch plus said roughness of the cone back face of the bearing inner ring and roughness of the large end faces of the tapered rollers, the radius of the large end face, full crowning and coating treatment applied to the rolling contact surfaces of the tapered rollers) were put to comparison tests (engine bench tests with motor drive).

The results are shown in the table below. In addition, after 8 hours of operation under such test conditions as radial load Fr=2,050 kgf, axial load Fa=2,310 kgf, rpm =1,400 (inner and outer, synchronized), axial clearance =80 μm, the wear depth of the raceway surface of the main shaft gear or bearing outer ring was measured and the external appearance was observed.

|  | Maximum wear depth (μm) | External appearance |
| --- | --- | --- |
| Control article | 14 | Fretting found |
| Inventive article | 5 | Fretting not found |

As is clear from the above table, in the present inventive article, as compared with the control article not having the particular values of roughness for the cone back face of the bearing inner ring or for the large end face of tapered rollers and not having full crowning and coating applied to the rolling contact surfaces of tapered rollers, wear due to fretting has greatly reduced.

What is claimed is:

1. A main shaft gear mechanism for automobile speed changers comprising an auxiliary shaft operatively connected to an input shaft associated with an automobile engine, an auxiliary shaft gear mounted on an auxiliary shaft, a main shaft operatively connected to an output shaft associated with the driving wheels, a main shaft gear which has a toothed portion integrally formed on its outer peripheral surface and constantly meshing with the auxiliary shaft gear and which has a raceway surface on its inner peripheral surface, a tapered roller bearing interposed between the main shaft and the main shaft gear, an imbalance means which produces a circumferential weight imbalance in the assembly of the tapered rollers and cage of the tapered roller bearing, a clutch gear connected to the main shaft gear, and a synchromechanism which effects or interrupts transmission of engine torque between the main shaft gear and the main shaft through the clutch gear by the action of a selector, wherein at least one of the roughness of the cone back face of the bearing inner ring and the roughness of the large end faces of the tapered rollers of the tapered roller bearing is not more than 0.05 μmRa.

2. A main shaft gear mechanism for automobile speed changers as set forth in claim 1, characterized in that the radius of the large end faces of said tapered rollers are worked such that the maximum value thereof including the working precision is substantially equal to the reference radius.

3. A main shaft gear mechanism for automobile speed changers as set forth in claim 1, characterized in that the roughness of the cone back face of the bearing inner ring of said tapered roller bearing is 0.01–0.04 μmRa, and the roughness of the large end faces of the tapered rollers is 0.01–0.05 μmRa.

4. A main shaft gear mechanism for automobile speed changers as set forth in claim 1, 2 or 3, characterized in that full crowning is applied to the rolling contact surfaces of the tapered rollers.

5. A main shaft gear mechanism for automobile speed changers as set forth in claim 4, characterized in that the radius of curvature of said full crowning is not more than 10,000 mm.

6. A main shaft gear mechanism for automobile speed changers as set forth in claim 1, 2, or 3 characterized in that the surfaces of the tapered rollers are formed with coating films of the $MoS_2$ type.

7. A main shaft gear mechanism for automobile speed changers as set forth in claim 4, characterized in that the surfaces of the tapered rollers are formed with coating films of the MoS type.

8. A tapered roller bearing comprising a bearing outer ring having a raceway surface on the inner peripheral surface thereof, a bearing inner ring having a raceway surface on the outer peripheral surface thereof, tapered rollers disposed between the raceway surface of the bearing outer ring and the raceway surface of the bearing inner ring and retained at predetermined circumferential intervals by a cage, and an imbalance means which produces circumferential weight imbalance in the assembly of tapered rollers and cage, wherein at least one of the roughness of the cone back face of the bearing inner ring and the roughness of the large end faces of the tapered rollers is not more than 0.05 $\mu$mRa.

9. A tapered roller bearing as set forth in claim 8, characterized in that the radius of the large end faces of said tapered rollers are worked such that the maximum value thereof including the working precision is substantially equal to the reference radius.

10. A tapered roller bearing as set forth in claim 8, characterized in the roughness of the cone back face of the bearing inner ring is 0.01–0.04 $\mu$mRa, and the roughness of the large end faces of the tapered rollers is 0.01–0.05 $\mu$mRa.

11. A tapered roller bearing as set forth in claim 8, 9 or 10, characterized in that full crowning is applied to the rolling contact surfaces of the tapered rollers.

12. A tapered roller bearing as set forth in claim 11, characterized in that the radius of curvature of said full crowning is not more than 10,000 mm.

13. A tapered roller bearing as set forth in claim 8, 9 or 10, characterized in that the surfaces of the tapered rollers are formed with coating films of the $MOS_2$ type.

14. A tapered roller bearing as set forth in claim 11, characterized in that the surfaces of the tapered rollers are formed with coating films of the $MoS_2$ type.

* * * * *